US008747148B2

(12) United States Patent
Roberts

(10) Patent No.: US 8,747,148 B2
(45) Date of Patent: Jun. 10, 2014

(54) DIAGNOSTIC TOOL WITH RECESSED CONNECTOR

(75) Inventor: Christopher I. Roberts, Cheshire (GB)

(73) Assignee: Bosch Automotive Service Solutions LLC, Warren, MI (US)

( * ) Notice: Subject to any disclaimer, the term of this patent is extended or adjusted under 35 U.S.C. 154(b) by 355 days.

(21) Appl. No.: 13/195,407

(22) Filed: Aug. 1, 2011

(65) Prior Publication Data

US 2012/0035804 A1 Feb. 9, 2012

Related U.S. Application Data

(60) Provisional application No. 61/370,264, filed on Aug. 3, 2010.

(51) Int. Cl.
*G06F 7/00* (2006.01)

(52) U.S. Cl.
USPC ......... 439/533; 701/33.2; 701/33.3; 439/76.1

(58) Field of Classification Search
USPC ........ 439/533, 76.1, 374, 655; 701/33.2, 33.3
See application file for complete search history.

(56) References Cited

U.S. PATENT DOCUMENTS 2,640,968 A 6/1953 Lehr
3,187,292 A * 6/1965 Small et al. .................... 439/275
3,627,929 A 12/1971 Gilissen et al.
4,294,039 A 10/1981 Dalheimer et al.
4,392,661 A 7/1983 Langenstein
4,767,350 A * 8/1988 Cooper et al. ................ 439/271
4,924,039 A 5/1990 McAllise et al.
D322,582 S 12/1991 Friedman
5,123,862 A * 6/1992 Suzuki .......................... 439/533
5,473,540 A 12/1995 Schmitz
5,491,418 A 2/1996 Alfaro et al.
5,496,185 A * 3/1996 Beak ............................... 439/95
5,687,081 A 11/1997 Wellman et al.
5,885,098 A * 3/1999 Witkowski .................... 439/369
5,916,286 A 6/1999 Seashore et al.
5,916,287 A 6/1999 Arjomand et al.
5,936,315 A 8/1999 Lais
6,094,609 A 7/2000 Arjomand
6,115,681 A 9/2000 Foreman et al.
6,169,943 B1 1/2001 Simon et al.
6,360,145 B1 3/2002 Robinson
6,362,421 B1 3/2002 Layton, Jr.
6,364,681 B1 * 4/2002 Watanabe ..................... 439/335
6,393,342 B2 5/2002 Bauer et al.
6,405,112 B1 6/2002 Rayner
6,438,472 B1 8/2002 Tano et al.
6,462,270 B1 10/2002 Depp et al.

(Continued)

OTHER PUBLICATIONS

International Search Report for PCT/US2011/046141; dated Dec. 16, 2011.

*Primary Examiner* — Gary Paumen
(74) *Attorney, Agent, or Firm* — Baker & Hostetler LLP

(57) ABSTRACT

A diagnostic tool that includes components that allow the diagnostic tool to record data while the vehicle is driven in order to capture data for intermittent faults. The diagnostic tool can operate in harsh conditions such as high and low temperatures. The diagnostic tool includes a capacitor to power the diagnostic tool in order to prevent complete drainage of the vehicle battery. The diagnostic tool includes a support module that can couple with a socket and a plug in order to keep them mated together during use.

16 Claims, 4 Drawing Sheets

(56) References Cited

U.S. PATENT DOCUMENTS 6,476,320 B1 11/2002 Ritter et al.
6,515,226 B2 2/2003 Chiriku et al.
6,539,358 B1 3/2003 Coon et al.
6,586,674 B2 7/2003 Krause et al.
6,633,482 B2 10/2003 Rode
6,655,985 B2 * 12/2003 Huang et al. .................. 439/533
6,687,584 B2 2/2004 Andreasen et al.
6,693,367 B1 2/2004 Schmeisser et al.
6,728,603 B2 4/2004 Pruzan et al.
6,745,151 B2 6/2004 Marko et al.
6,757,600 B2 6/2004 Bachle
6,799,101 B2 9/2004 Hawig et al.
6,807,469 B2 10/2004 Funkhouser et al.
6,808,396 B2 * 10/2004 Kawaguchi et al. ......... 439/76.1
6,816,760 B1 11/2004 Namaky
6,823,243 B2 11/2004 Chinnadurai et al.
6,832,141 B2 12/2004 Skeen et al.
6,847,916 B1 1/2005 Ying
6,848,916 B2 2/2005 Nakayama et al.
6,859,696 B2 2/2005 Schade et al.
6,871,156 B2 3/2005 Wallace et al.
6,875,050 B2 * 4/2005 Ito et al. ........................ 439/533
6,881,899 B1 4/2005 Trangsrud
6,904,586 B1 6/2005 Bemanian et al.
6,907,445 B2 6/2005 Pellegrino et al.
6,916,985 B1 7/2005 Harwood
6,936,155 B1 8/2005 Morimitsu et al.
6,937,926 B2 8/2005 Lipscomb et al.
D510,044 S 9/2005 Ribeiro et al.
D510,045 S 9/2005 Lipscomb et al.
6,939,155 B2 * 9/2005 Postrel .......................... 439/297
6,941,203 B2 9/2005 Chen
D510,859 S 10/2005 Dixon et al.
6,957,133 B1 10/2005 Hunt et al.
6,993,421 B2 1/2006 Pillar et al.
D518,394 S 4/2006 Lipscomb et al.
D519,046 S 4/2006 Lipscomb et al.
D519,859 S 5/2006 Chinnadurai et al.
7,048,569 B2 * 5/2006 Shimizu ........................ 439/354
7,054,727 B2 5/2006 Kemp et al.
7,058,488 B2 6/2006 Kemp et al.
7,079,927 B1 7/2006 Tano et al.
7,091,440 B2 8/2006 Gabbianelli et al.
7,099,750 B2 8/2006 Miyazawa et al.
7,113,127 B1 9/2006 Banet et al.
7,117,984 B2 10/2006 Jordison et al.
7,128,616 B1 * 10/2006 Orr et al. ....................... 439/651
7,149,612 B2 12/2006 Stefani et al.
7,155,321 B2 12/2006 Bromley et al.
7,155,322 B2 12/2006 Nakahara et al.
7,168,989 B2 * 1/2007 Faulkner .................. 439/620.22
7,208,685 B2 4/2007 Browning et al.
7,224,262 B2 5/2007 Simon et al.
7,239,945 B2 7/2007 Hiemer et al.
7,254,550 B2 8/2007 Reichwein et al.
7,288,007 B2 * 10/2007 Wu .............................. 439/638
7,302,314 B2 11/2007 Sommer
7,305,289 B2 12/2007 Gessner et al.
7,430,465 B2 9/2008 Liebl et al.
8,152,562 B2 * 4/2012 Gross ............................ 439/533
8,241,061 B2 * 8/2012 Chazottes et al. ............ 439/587
8,406,931 B2 * 3/2013 McMasters et al. .......... 700/282
2001/0044677 A1 11/2001 Bauer et al.
2002/0007237 A1 1/2002 Phung et al.
2003/0158640 A1 8/2003 Pillar et al.
2003/0182033 A1 9/2003 Underdahl et al.
2004/0044453 A1 3/2004 Malik et al.
2004/0065461 A1 4/2004 Browning et al.
2004/0083041 A1 4/2004 Skeen et al.
2004/0111189 A1 6/2004 Miyazawa et al.
2004/0148073 A1 7/2004 Hawig et al.
2004/0172177 A1 9/2004 Nagai et al.
2005/0096809 A1 5/2005 Skeen et al.
2005/0106945 A1 * 5/2005 Suzuki et al. ................. 439/655
2005/0107929 A1 5/2005 Haydn
2005/0216775 A1 9/2005 Inoue
2006/0019513 A1 * 1/2006 Mizuno et al. ............... 439/76.1
2006/0041347 A1 2/2006 Chinnadurai et al.
2006/0106514 A1 5/2006 Liebl et al.
2007/0069734 A1 3/2007 Bertness
2008/0103656 A1 5/2008 Lipscomb et al.
2008/0113524 A1 * 5/2008 Ha et al. .......................... 439/39
2009/0140575 A1 6/2009 McGee et al.
2010/0127857 A1 5/2010 Kilmurray et al.
2010/0325457 A1 12/2010 Lachwani et al.
2011/0081798 A1 * 4/2011 Koreeda et al. ............... 439/374
2011/0183540 A1 * 7/2011 Keenihan et al. ............. 439/345
2011/0273839 A1 * 11/2011 Villegas et al. .......... 361/679.41
2012/0071023 A1 * 3/2012 Kuhlmann .................... 439/533

* cited by examiner

DIAGNOSTIC TOOL WITH RECESSED CONNECTOR

CROSS-REFERENCE TO RELATED APPLICATIONS

This application claims priority to U.S. Provisional Patent Application entitled, "Vehicle Diagnostic, Communication and Signal Delivery System," filed Aug. 3, 2010, having a Ser. No. 61/370,264, the disclosure of which is hereby incorporated by reference in its entirety.

FIELD OF THE INVENTION

This patent application relates generally to a vehicle diagnostic and communication system. More specifically, an on-road vehicle data recording system, such as a diagnostic tool, and a reliable signal delivery connector and support structure module.

BACKGROUND OF THE INVENTION

When a problem arises in a vehicle, such as an automobile, the owner takes the automobile to a service station or a garage for a mechanic to diagnose the problem. If the problem occurs frequently or occurs at the service station, then the mechanic can diagnose the problem with the diagnostic tools on site. However, the problem can be intermittent and may not occur when the vehicle is at the service station, thus the mechanic may not be able to diagnose the problem. If the mechanic cannot diagnose the problem while the vehicle is at the service station, the owner can become frustrated because the problem still exists and he has taken time off from work in order to bring the vehicle in for service. Further, the owner will have to take additional time off to bring the vehicle back for servicing when the intermittent problem occurs again. This scenario can be repeated many times before the problem is properly diagnosed.

An intermittent problem or event may be a spark plug in one of the vehicle's cylinder that does not fire properly when the vehicle hits a bump in the road at certain speeds causing the vehicle to lose power. The event does not occur every time the vehicle hits a bump, but does occur enough that the owner is frustrated. Further, should the intermittent problem occur when the vehicle is in the middle of an intersection, the owner may cause an accident due to loss of power during acceleration across a crowded intersection. However, since the event may not be recreated at the service station or when the mechanic takes the vehicle for a test drive, it will be difficult for the mechanic to diagnose the problem.

Further, there are times when the diagnostic tool require a connection to external devices for updating or increasing functionality. Once such connection is a USB (Universal Serial Bus) connection. However, USB connections are meant for light duty in a home or an office and often are accidentally disconnected or damaged while in use in a harsh environment of a service station. The disconnection creates issues to a user and to the diagnostic tool.

Accordingly, it is desirable to provide an apparatus and method that can left attached to the vehicle in order to record certain events that occurs in the vehicle. It is also desirable to provide an apparatus that allows better connection between a computing device, such as a diagnostic tool and a USB connector.

SUMMARY OF THE INVENTION

The foregoing needs are met, to a great extent, by the present invention, wherein in one aspect a diagnostic tool is provided that in some embodiments include a recessed connector, such as a recessed USB connector.

In accordance with one embodiment of the present invention, a diagnostic tool is provided, which can include a processor to control functions of the diagnostic tool and retrieves diagnostic data from a vehicle, a memory that stores a software to operate the diagnostic tool and the retrieved diagnostic data, the memory communicates with the processor and stores diagnostic data in a circular buffer, a connector interface that connects the diagnostic tool to a data link connector in the vehicle, the connector interface communicates with the processor, a serial communication interfaces that allows the diagnostic tool to communicate with the vehicle in at least one communication protocol, the serial communication interfaces communicates with the processor, and a recessed interface socket within a housing of the diagnostic tool, the recessed interface socket having a removable support structure module, wherein the support structure module includes a first cavity, a second cavity and a passage formed between the first and second cavities.

In accordance with another embodiment of the present invention, a diagnostic tool is provided, which can include a means for processing functions of the diagnostic tool and retrieves diagnostic data from a vehicle; a means for storing a software to operate the diagnostic tool and the retrieved diagnostic data, the means for storing communicates with the means for processing and stores diagnostic data in a circular buffer; a means for interfacing the diagnostic tool to a data link connector in the vehicle, the means for interfacing communicates with the means for processing; a means for communicating that allows the diagnostic tool to communicate with the vehicle in at least one communication protocol, the means for communicating communicates with the processor; and a means for receiving that is recessed and formed within a housing of the diagnostic tool, the means for receiving having a removable support structure module, wherein the support structure module includes a first cavity, a second cavity and a passage formed between the first and second cavities.

In accordance with yet another embodiment of the present invention, a support module for a connector is provided, which can include a housing having a first cavity and a second cavity; and a passage between the first and second cavities, wherein the passage has an opening that is less than a first opening of the first passage or a second opening of the second passage and wherein the support module is adapted to fit into a recessed portion of a diagnostic tool.

There has thus been outlined, rather broadly, certain embodiments of the invention in order that the detailed description thereof herein maybe better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
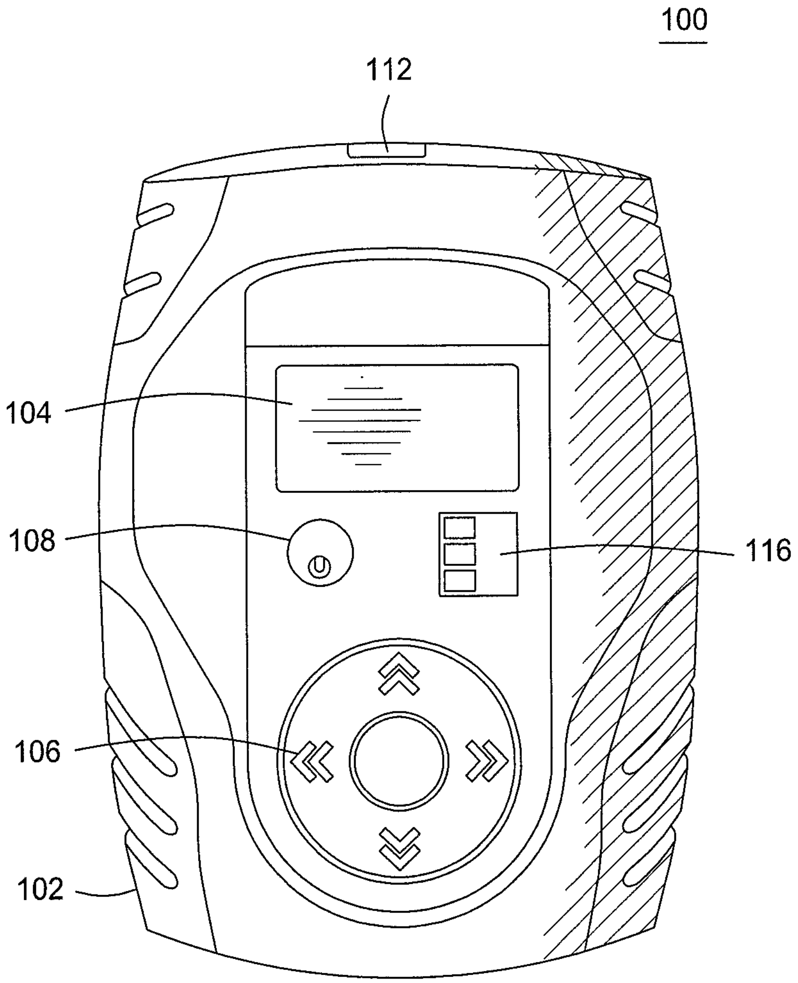
FIG. 1 is a plan view illustrating a diagnostic tool according to an embodiment of the invention.

The invention will now be described with reference to the drawing figures, in which like reference numerals refer to like parts throughout. An embodiment in accordance with the present invention provides an apparatus, such as a diagnostic tool and method that allow the diagnostic tool to record certain events and the related diagnostic data in a vehicle. In other embodiments, the diagnostic tool includes the connection 114, such as a USB connection that holds the USB connector in place when mated with the diagnostic tool.

As noted above, frequent intermittent faults occur under certain driving conditions which may include, for example, engine load, road speed, altitude and temperature. Therefore, intermittent faults in a vehicle's electromechanical systems are difficult to diagnose in the static confines of a service bay. To observe the fault occurrence, it is desirable to have the diagnostic tool for logging the fault data when it occurs during a vehicle's normal operating conditions. Vehicle's harsh environmental conditions, like climatic extremes and vehicle power fluctuations, are a challenge when using the diagnostic tool during the vehicle's operations and can hamper the diagnostic tools' operations.

The diagnostic tool described herein has improved reliability, power efficiency, operating temperature range and recording capacity. The diagnostic tool can be left in a vehicle to reliably record vehicle operational data over an extended period of time without being affected by environmental temperature extremes and without discharging a vehicle battery.

To achieve the desirable performance, the diagnostic tool can be configured to operate in a plurality of modes including a normal operating mode and at least one power saving mode. The diagnostic tool may enter a power saving mode based on a passage of time without detecting an active operation of the vehicle or based on detection of an environmental condition as further discussed below.

An embodiment of the present inventive apparatus is illustrated in FIG. 1. In particular, FIG. 1 is a plan view illustrating a diagnostic tool 100 according to an embodiment of the invention. The diagnostic tool 100 can be any computing device, such as the Honda MVCI from Service Solutions (a unit of the SPX Corporation) in Warren, Mich. The diagnostic tool 100 includes a housing 102 to house the various components of the diagnostic tool, such as a display 104, a user interface 106, a power key 108, a memory card reader 110 (FIG. 2), a wireless interface 111 (optional), a connector interface 112, a connection 114 and indicator lights 116.

The display 104 can be any type of display, for example, a liquid crystal display (LCD), a video graphics array (VGA), a touch display (which can also be a user interface), etc. The display can turn OFF after a certain period of time that the tool is not being used. For example, when no buttons are pressed or no data being retrieved from the vehicle for ten minutes, five minutes, three minutes or 1 minute. However, any time period can be set for turning OFF the display so that the battery (internal or vehicle's) can be conserved.

The user interface 106 allows the user to interact with the diagnostic tool 100 in order to operate the diagnostic tool as desired. The user interface 106 can include function keys, arrow keys or any other type of keys that can manipulate the diagnostic tool 100 in order to operate various menus that are presented on the display. The keys can also include a "back" or "enter." The input device 106 can also be a mouse or any other suitable input device, including a keypad, or a scanner. The user interface 106 can also include numbers or be alphanumeric.

The power key 108 allows the user to turn the diagnostic tool 100 ON and OFF, as desired. The diagnostic tool 100 can automatically turn OFF after a user-selectable period of time of inactivity (e.g. no buttons pressed or data being collected from the vehicle). The power for the diagnostic tool 100 can be supplied from internal batteries of the tool, a capacitor (described below), from the vehicle's battery when the tool is coupled to the DLC, from a connection to a computing device, such as through a USB connection or from an AC adapter (described below). If the power source is the vehicle or through a connection (such as a computing device), then the tool can power on automatically once the tool is connected to the vehicle or computing device.

Memory card reader 110 can be a single type card reader, such as a compact flash card, floppy disc, memory stick, secure digital memory, flash memory or other types of memory. The memory card reader can be a reader that reads more than one of the aforementioned memory such as a combination memory card reader. Additionally, the memory card reader can also read any other computer readable medium, such as CD, DVD, UMD, etc. In one embodiment, the memory card reader can be used to update the software or databases that are in the diagnostic tool 100.

The connector interface 112 allows the diagnostic tool 100 to connect to an external device, such as an ECU of a vehicle, a computing device, an external communication device (such as a modem), a network, etc. through a wired or wireless connection (111). In addition, a connection 114 can also be included on the diagnostic tool 100 in order to connect to USB, FIREWIRE, modem, RS232, RS485, and other connections to communicate with external devices, such as a hard drive, USB drive, CD player, DVD player, UMD player, PC or other computer readable medium devices. Connection 114 can include a wireless card that can be inserted into it for wireless communication. In addition to connection 114, optional wireless interface 111 can communicate wirelessly using including but not limited to iEEE802.11a/b/g/n, satellite, infrared, cellular, radio, etc. Wireless interface 111 can be used with connection 114 or connector interface 112. By using a wired or wireless connection, the diagnostic tool can communicate with remote host devices or servers in order to receive or send information between the devices. Indicator lights 116 can indicate various operations of the diagnostic tool such as battery life, wireless connection, power on/off and other operations.

Figure 2:
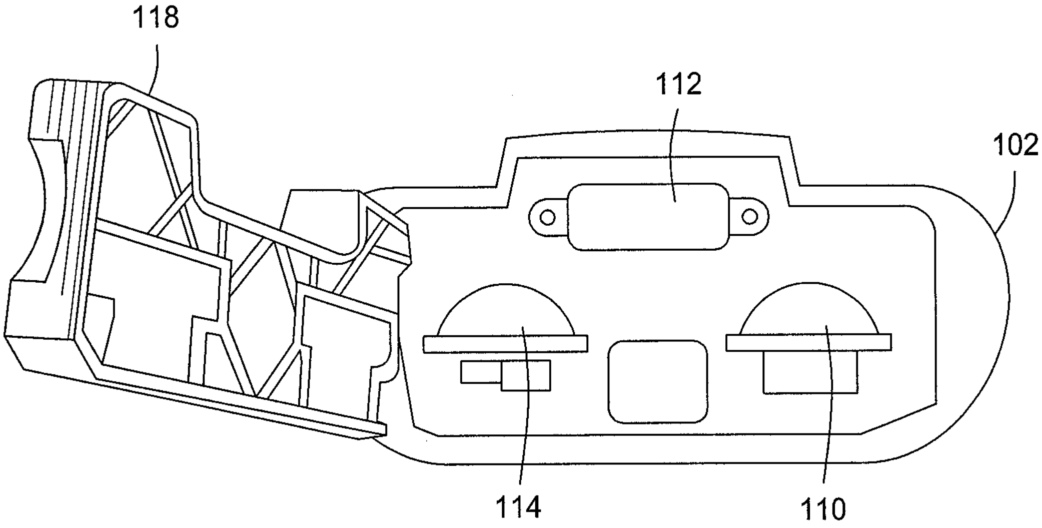
FIG. 2 illustrates a top view of the diagnostic tool of FIG. 1 according to an embodiment of the invention.

FIG. 2 illustrates a top view of the diagnostic tool 100 of FIG. 1 according on an embodiment of the invention. The top portion of the diagnostic tool includes the memory card reader 110, connector interface 112, connection 114, and a cover 118. Connection 114 will be further discussed below.

Figure 3:
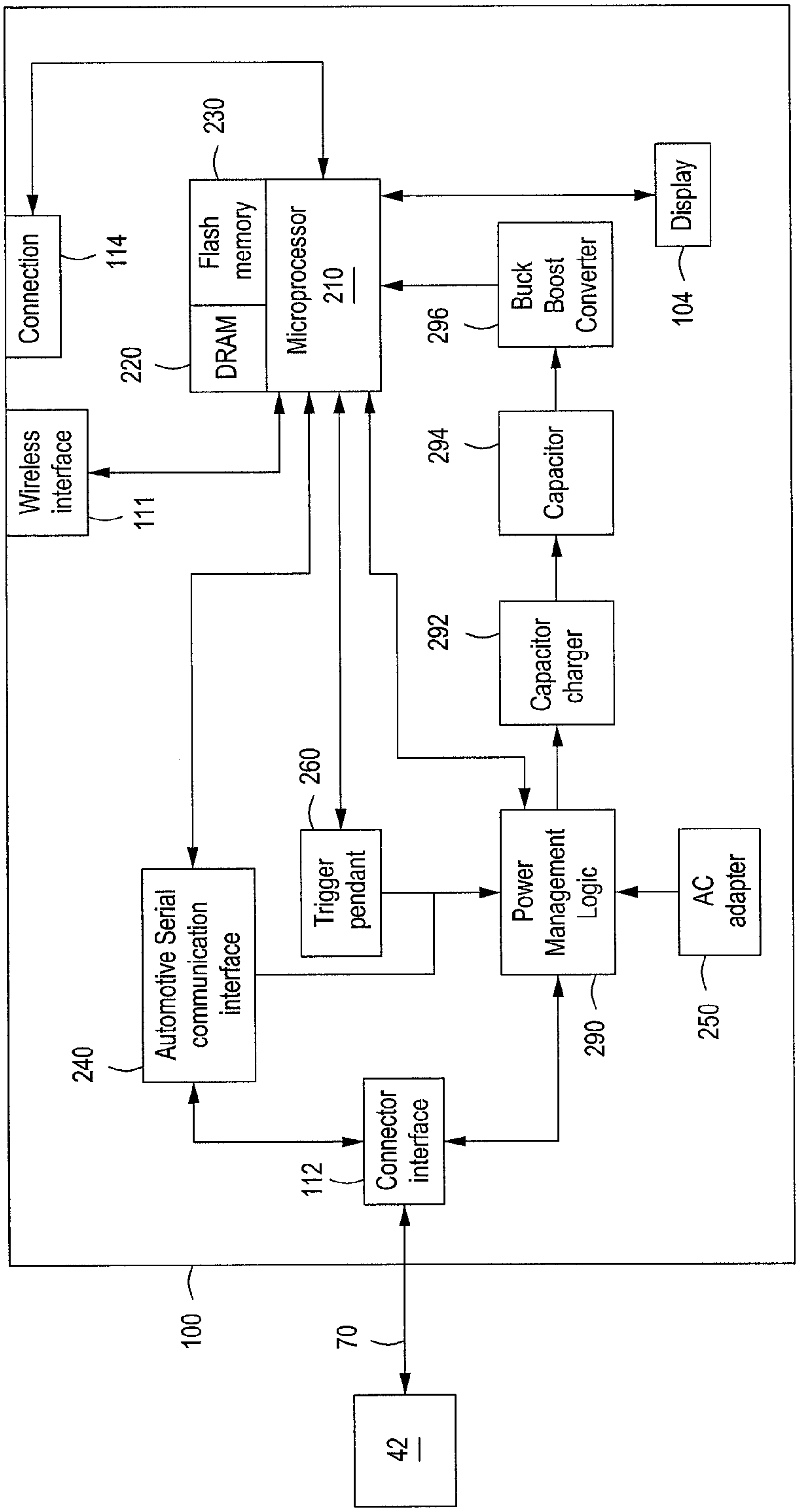
FIG. 3 illustrates a block diagram of the diagnostic tool of FIGS. 1 and 2 according to an embodiment of the invention.

FIG. 3 illustrates a block diagram of the diagnostic tool 100 of FIGS. 1 and 2 according to an embodiment of the invention. The exemplary implementation comprises a microprocessor 210, for example, an 8, 16 32 or 64 bit microprocessor; a Dynamic Random Access Memory (DRAM) 220 having a circular buffer; a flash memory 230, for example, either onboard or plug-in flash memory storage; an automotive serial communication interfaces 240; a power management logic unit 290; an electric double layer capacitor (EDLC) or pseudo capacitor 294; a capacitor charger 292 for charging the capacitor 294 using constant current, and constant power; a wide input voltage range power regulator or buck boost converter 296; the connector interface 112; trigger button with indicator 260; connection 114; display 104; optional wireless interface 111; and an AC adapter 250.

FIG. 3 illustrates diagnostic tool 100 coupled to vehicle 42 via the connector interface 112 and the data link connector (DLC) 70. Diagnostic tool 100 may be releasably mounted to the vehicle such that diagnostic tool 100 operates in an on-road configuration. In an on-road configuration, diagnostic tool 100 may be packaged and mounted to the vehicle in any suitable location. The diagnostic tool 100 may be mounted on a windshield, on the vehicle's dashboard passenger seat, foot well, map pocket, etc. Though, it should be appreciated that other embodiments are possible in which the diagnostic tool 100 may be separate or releasably disconnected from and coupled to vehicle 42 at a service station for collecting diagnostic data. Even when used at a service station, diagnostic tool 100 may be placed within a vehicle so that on-road data may nonetheless be collected.

In one embodiment, data collection may be controlled by the microprocessor 210 of the diagnostic tool 100. The microprocessor 210 controls and enables data and information exchange between the diagnostic tool 100 and the vehicle 42. The data and information exchange can be uni-directional or bi-directional. In one example, the microprocessor requests data from the vehicle through the automotive serial communication interfaces 240, which can include the necessary hardware and software to communicate in the vehicle's various communication protocols. The communication protocols can include Controller Area Network (CAN), J1850 VPM and PWM, ISO 9141, Keyword 2000 Ethernet, Flex Ray and others.

The data collection may begin at any suitable time in response to any suitable event. In some embodiments, data collection may begin when a user's activation of the electric system of the vehicle is detected. Such an event may be signaled by a user's action such as turning a key in the ignition of the vehicle or pressing a button to start the vehicle. Regardless of the nature of the triggering event, the microprocessor may receive a signal from either the vehicle 42 or a user indicating that such an event occurred. Various communication protocols can be employed for data and information exchange between vehicle 42 and diagnostic tool 100 as discussed herein. In an example, OBDII standard is used for requesting data from the vehicle via the DLC 70, which is connected to vehicle's OBDII (On Board Diagnostics) port (not shown). The OBDII standard specifies the type of diagnostic connector, the electrical signaling protocols available, the messaging format and a candidate list of vehicle parameters to monitor along with how to encode the data. The vehicle system responds by sending vehicle operational data of relevant parameters according to the request. The diagnostic tool 100 receives, processes and stores the data.

In another embodiment, the vehicle system may transmit unsolicited data which can also be received, processed and stored in the diagnostic tool. Such unsolicited data may include an indication of an event, such as when one or more signal are outside their respective predetermined ranges. The received data may be buffered in volatile storage. In some embodiments, received data is stored in a circular buffer. In one embodiment, the circular buffer is implemented in DRAM 220. A pre-configured filter can be additionally applied to limit the amount of data stored in the buffer. The filter may be programmed so as to preclude data that is irrelevant (e.g. normal data parameter) to diagnosing a vehicle condition from being stored or to limit storage of information to only specified types of data that may be useful in diagnosing an intermittent fault. The filter may be implemented by programming of the microprocessor 210 or in any other suitable way. The received data may represent any suitable data that may be generated in a vehicle. For example, the received data may represent data generated by an engine control module or other electronic module within a vehicle. The received data may be of a type generated using techniques known in the art for diagnosing a problem with a vehicle. Though, any suitable type of data may be received, real time information such as vehicle speed and temperature can also be recorded alongside the received data.

In still another embodiment, data continues to be stored even after the circular buffer is filled by, overwriting the oldest data with the most recent data. The storing and overwriting of data in the circular buffer continues until a trigger event occurs under which the microprocessor begins the process of transferring the content of the circular buffer into non-volatile storage, such as flash memory 230, or until the vehicle becomes inactive wherein the diagnostic tool 100 reverts to a passive state.

In one embodiment, a trigger event is recognized by the diagnostic tool 100, for example, by programming the microprocessor 210 to recognize a match between received data content and a pre-determined trigger pattern such as data outside operating parameters. The pre-determined trigger pattern may be determined by statistical significance or the amount by which the data collected is outside the normal operating parameters of the vehicle under tests. The diagnostic tool has a database of normal operating parameters for each vehicle under test. Alternatively, in another embodiment, in the event that the vehicle driver notices a vehicle behavior anomaly, a user interface can be provided for the driver to manually start the trigger event. In an example, a button on a pendant 260 in a passenger compartment of the vehicle can be used for the driver to signal the occurrence of a trigger event. In operation, the trigger event causes the microprocessor 210 to begin the process of transferring the content of the circular buffer 220 into flash memory 230. In an example, received data from the vehicle continues to be recorded in the circular buffer 220 while the transfer to flash 230 memory process is in operation. In an embodiment, the microprocessor 210 transfers pre-trigger and/or post-trigger data to flash memory. The data quantity or time duration (10 minutes, 5 minutes, 1 minute, etc.) for the pre-trigger and/or post trigger data is pre-configurable up to the limit of the size of the circular buffer DRAM memory, for example. Once the transfer to flash memory 230 process is complete, the diagnostic tool 100 continues receiving data to the circular buffer. Subsequent trigger cycles repeat the transfer process, with multiple triggered data sets being separately recordable into flash memory 230. The maximum number of recordable trigger events is limited only by the flash memory 230 size allocated for the purpose. Thus, having a removable/replaceable flash memory according to an embodiment of the invention will expand the number of recordable trigger events.

When the vehicle is in an inactive condition, e.g., when the vehicle is not being driven and the vehicle electrical system is inactive, usually several minutes after the ignition key (or, for keyless vehicles, other user action performing a corresponding function of shutting down the vehicle) is removed, there is typically no longer a need to request data, as no new data is being generated by the vehicle. In this case, the diagnostic tool 100 reverts to a power saving mode, here identified as a passive state. In the passive state, the diagnostic tool is still responsive to unsolicited data arriving from the vehicle, but one or more other functions of the diagnostic tool may be disabled. For example, in a passive state, diagnostic tool 100 does not actively poll the vehicle for data. After a pre-determined time in the passive state, for example between 30 minutes and an hour in some embodiments, the diagnostic tool 100 may revert to a second power saving mode, here identified as a sleep state. In some embodiments, the sleep state is characterized by low power consumption in order to reduce power drawn from the vehicle battery. This prevents the vehicle battery from being discharged, for example overnight, or during long parked periods. Power for the diagnostic tool 100 may be drawn from the vehicle battery through the DLC or through the cigarette lighter.

In the sleep state, the microprocessor 210 is inactive, however the DRAM memory 220 remains powered with auto-refresh operation. All session data is, therefore, preserved according to standard suspend to RAM techniques. This allows a rapid resume from the sleep state. The power management logical unit 290 remains active during the sleep state, and monitors incoming data from the serial communication interfaces 240. Data received in this state would typically cause the power management logical unit to resume the microprocessor which allows the diagnostic tool to be immediately responsive to new data activity from the vehicle. Though, it should be appreciated that when in the sleep state, the diagnostic tool 100 may selectively respond to events. In one embodiment, the power management logical unit 290 can be pre-configured to be unresponsive to certain received data or responsive only to certain received data such that the diagnostic tool responds to only certain vehicle activities. In an example, the power management logical unit 290 is capable of buffering a few frames of data while the microprocessor is in the process of resuming from the sleep state. The recorded data can be held in flash memory until the diagnostic tool is up for further processing, for example, by a mechanic. Recorded data can then be uploaded for analysis to a computer with suitable computer program or software installed.

Features and Operations of the Diagnostic Tool:

Power Saving "Suspend to Ram" with Rapid Resume

The described diagnostic tool provides a power saving mode, identified above as the sleep state, which preserves the data buffer and context. In the power saving mode, the system is not fully powered so as to save energy, and does not revert to a complete power off state either. One advantage of doing so is that a lengthy microprocessor cold boot, which typically takes 20 seconds, can be avoided, and therefore, prevents data loss before data capture can recommence.

In another embodiment, the diagnostic tool 100 achieves low power consumption circa 20 mA with the microprocessor core in an inactive state while preserving the data buffer contents using DRAM in self-refresh mode. To resume from the inactive mode, in one embodiment, the power management logic unit 290 senses incoming vehicle data or the diagnostic tool detects a manual button pressed via the trigger pendant, and resume "stimulus" is provided to the microprocessor. A fast startup through "resume from suspend" of 2 seconds can be accomplished. In one embodiment, an event triggered wake-up mechanism transitions the diagnostic tool from the at least one power saving mode to the normal operating mode.

High Ambient Temperature Capability

In the event that the vehicle is left unattended in direct sunlight in hot climates, the interior temperature of the vehicle can reach over 80 C. A fully active diagnostic tool generates additional heat internally. Temperatures inside the diagnostic tool's enclosure can reach 10 to 20 C higher than vehicle's internal ambient temperature. This normally limits a diagnostic tool to use a very low power and low performance microcontroller with limited capacity SRAM, or limits ambient operating range, for example, to less than 50 C (commercial grade components) or 65 C (Industrial grade components).

The embodiment of the invention provides a low power suspend mode in which the diagnostic tool operates at a fraction of the nominal operating power, thus at a lower operating temperature. In an implementation, the diagnostic tool reduces microprocessor clock speed to substantially zero and/or removes some power supply rails. In an example, the diagnostic tool achieves a reduced internal temperature rise of less than 5 C above ambient. In another implementation, temperature sensitive components such as wireless interface adapters are held in reset or power-down state. This enables the diagnostic tool to remain reliably responsive to the trigger events for a prolonged time at ambient temperatures up to 80 C while keeping components still within their operating temperature specification.

Low Ambient Temperature Capability

When a diagnostic tool 100 is used in a vehicle exposed to very low ambient temperature, for example, parked overnight in cold climates, the diagnostic tool needs to remain responsive to vehicle data being generated. If a cold engine is cranked at very low ambient temperatures, the engine oil is viscous, putting a heavy load on the starter motor, demanding high current. At such low temperatures, the vehicle battery current delivery performance is also reduced. Consequently, the vehicle system voltage may dip to almost zero momentarily as the starter motor is energized. In some embodiments, it may be desirable for the diagnostic tool to include reserve backup power to prevent data loss during the cranking period. The described diagnostic tool may function without using secondary battery cells such as Alkaline manganese cells, lithium primary cells, NiCad, Li-Ion or similar cells to power the microprocessor, thus avoiding performance degradation caused by the secondary battery cells unreliability at extreme temperature conditions. Utilization of secondary battery cells generally requires use of low performance microcontrollers and small capacity SRAM buffer memory. However, modern vehicles that have become more complex and functionality rich may generate more data than can be handled by a low performance microprocessors and small capacity SRAM. Accordingly, in some embodiments, a higher performance microprocessor and/or a higher capacity DRAM may be employed with an energy storage device that can provide adequate power even at extreme low temperatures.

In one embodiment, the described diagnostic tool uses an Electric Double Layer Capacitor (EDLC) to store backup energy in place of the secondary battery cell(s). EDLC's capability of operating efficiently at the very low temperature, which generally runs to −40 C, not only greatly improves the diagnostic tool's temperature range but also enables using of high performance microprocessor and large DRAM.

In operation, the EDLC 294 is charged rapidly from the vehicle power source through a constant current or constant power switched-mode converter such as a capacitor charger 292 until fully charged. The capacitor charger 292 provides a faster method compared to conventional fixed voltage and resistive current limited (RC) chargers, thus allowing rapid charge recovery between cranking cycles. The power management logic unit 290 switches the power path from the EDLC to provide the required power supporting the high performance microprocessor and large DRAM during momentary dips in vehicle's power. With the capacitor 294, power is always available for use by the diagnostic tool in the event that the vehicle is not operating or the diagnostic tool is not plugged into a reliable power source. This allows the diagnostic tool to continue to capture data from the vehicle at all times and reliable data retention at a wider ambient temperature range.

In another embodiment, the EDLC charge cutoff voltage is automatically reduced at high ambient temperatures to allow extension of the upper operating temperature range of the capacitor 294. In still another embodiment, the useable charge and therefore run time from the capacitor is increased by using a buck-boost voltage regulator 296 to convert the variable voltage from the capacitor to a constant voltage supply to the microprocessor and DRAM.

In an example embodiment, the diagnostic tool may be powered from a vehicle power system, but may also be configured to be powered from an AC adapter 250. AC power may be used, for example, during configuration setup or when uploading data from system 100 to another computer for analysis. In this use case, the capacitor is charged from the AC adapter 250.

In some embodiments, the connection of AC power may trigger a state change in which the system enters an active state. In such an active state, microprocessor 210 may be configured to receive and respond to commands, which may be entered through a pendant 260, through serial communication interfaces 240 or in any other suitable way. Upon disconnection from the AC adapter, the diagnostic tool reverts to the suspend state, allowing rapid resume once connected to the vehicle power source.

In an extension of the foregoing concept, the diagnostic tool 100 may be packaged in housing 102 such that the EDLC 294 is serviceable in the field. In such an embodiment, a new capacitor unit can be ordered and fitted by the end-user; only a small screwdriver is required for the operation.

The diagnostic tool 100 described herein is not limited to on-road application, but with the addition of a PC data cable, for example USB, or a Wireless Interface, the diagnostic tool can be used in pass-through mode as a communication gateway for regular in-workshop diagnostic applications and vehicle reprogramming. The diagnostic tool allows mechanics to repair vehicles with difficult-to-diagnose intermittent faults. The diagnostic tool provides means for safe and reliable capture of fault information while the vehicle is being driven on the road. The mechanic and vehicle owner's time are saved since the vehicle owner can operate the vehicle while the diagnostic tool is performing the diagnosis data capture.

Thus, in various embodiments of the invention, the diagnostic tool 100 exhibits various desirable characteristics including uses in wide ambient temperature operating range; consumes negligible power from the vehicle battery, thus avoiding overnight discharge of the negligible power from the vehicle battery; avoids stored data loss during momentary vehicle power dips; uses a high performance microprocessor and high recording capacity memory; and improves reliability without relying on primary or secondary battery cells.

Support Structure for Connectors

In another embodiment, the diagnostic tool 100 includes the connection 114 which may have a support structure for providing support to a signal delivery connector e.g., a communication socket connector such as an Ethernet connector, a USB type A or USB type B connector, etc. A communication connector is commonly used in various signal delivery applications including some with harsh environmental conditions, for example, automobile or automotive servicing and manufacturing industry. It is very desirable to enhance the communication connector's reliability such as by enhancing its mechanical strength so that the communication connector (Ethernet, USB, etc.) originally designed for light duty office and home use with light weight peripherals and cables can withstand the harsh environments. Since some communication connectors, like USB (type A or B) connectors, have become a de-facto standard in IT equipment, it may be more economical to use a standard USB connector; such use may be facilitated by enhancing the USB connector's reliability.

FIGS. 4A-D illustrate front, rear and side views of a support structure for a USB socket connector according to an embodiment of the invention. The exemplary implementation includes the housing 102 having the connection 114 that includes a USB socket 172 and a communication printed circuit assembly (PCA) 173. Housing 102 may be part of any suitable electronic device to which data communications may be implemented in a rugged environment. That environment, for example, may be in a vehicle, vehicle service station or vehicle manufacturing facility. In one embodiment, the electronic device may be any suitable device, including the diagnostic tool 100 of FIG. 1. The diagnostic tool 100 includes the connection 114 which may be a standard communication connector, such as a USB receptacle, also called the USB socket 172. It should be noted that in other embodiments, the present invention may be used with connectors of any suitable type, such as Ethernet, Firewire, etc. As is known in the art, a socket is adapted to receive a plug style connector. The USB socket 172 may be ruggedized through the use of a support structure module. An exemplary support structure module 120 is shown in a front view in FIG. 4B and is configured to provide support to the USB socket 172. In some embodiments, the support structure module 120 is removably mounted to connection 114 so that it can be replaced, for example, from a USB type module to an Ethernet type module or any other type of module. In other implementation, the support structure module 120 is permanently mounted to the connection 114. A fastening feature, for example, screws 144, may be employed to mount (removably or permanently) the support structure module 120 to screw holes 131 on the connection 114.

The support structure module 120 may include a first cavity 133 and a second cavity 135 having a passage 137 therein between. The first cavity 133 may be sized to receive the USB socket 172 having the printed circuit assembly 173. The second cavity 135 may be sized to receive a USB plug 160. The passage 137 may be positioned such that a mating portion of the USB plug 160, when the USB plug is inserted into the second cavity 135, will pass through the passage 137 and engage the USB socket 172 in the first cavity 133. The passage 137 may have a beveled opening facing the second cavity 135 such that the mating portion of the USB plug 160 is guided into the passage as it is inserted.

Further, the first cavity 133 and the second cavity 135 may be shaped such that, when the USB plug 160 and USB socket 172 are mated, a receptacle, along with a printed circuit board to which it is attached, are held snugly within the first cavity 133 and the USB plug 160 is held snugly within the second cavity 135. In this way, force on the USB plug 160 tends to be transferred through the support structure module 120, rather than being transferred to the receptacle in the USB socket 172, which reduces the likelihood that the receptacle will be damaged. Further, the passage 137 along with the second cavity may cooperate with each other to support various portions of the USB socket 172 or any other type of connection socket such as Ethernet, Firewire, etc. That is the passage may hold one portion of the USB socket 172 and the second cavity may hold another portion of the USB socket so that the USB socket is snuggly held.

Figures 4, 4A, 4B, 4C, 4D:
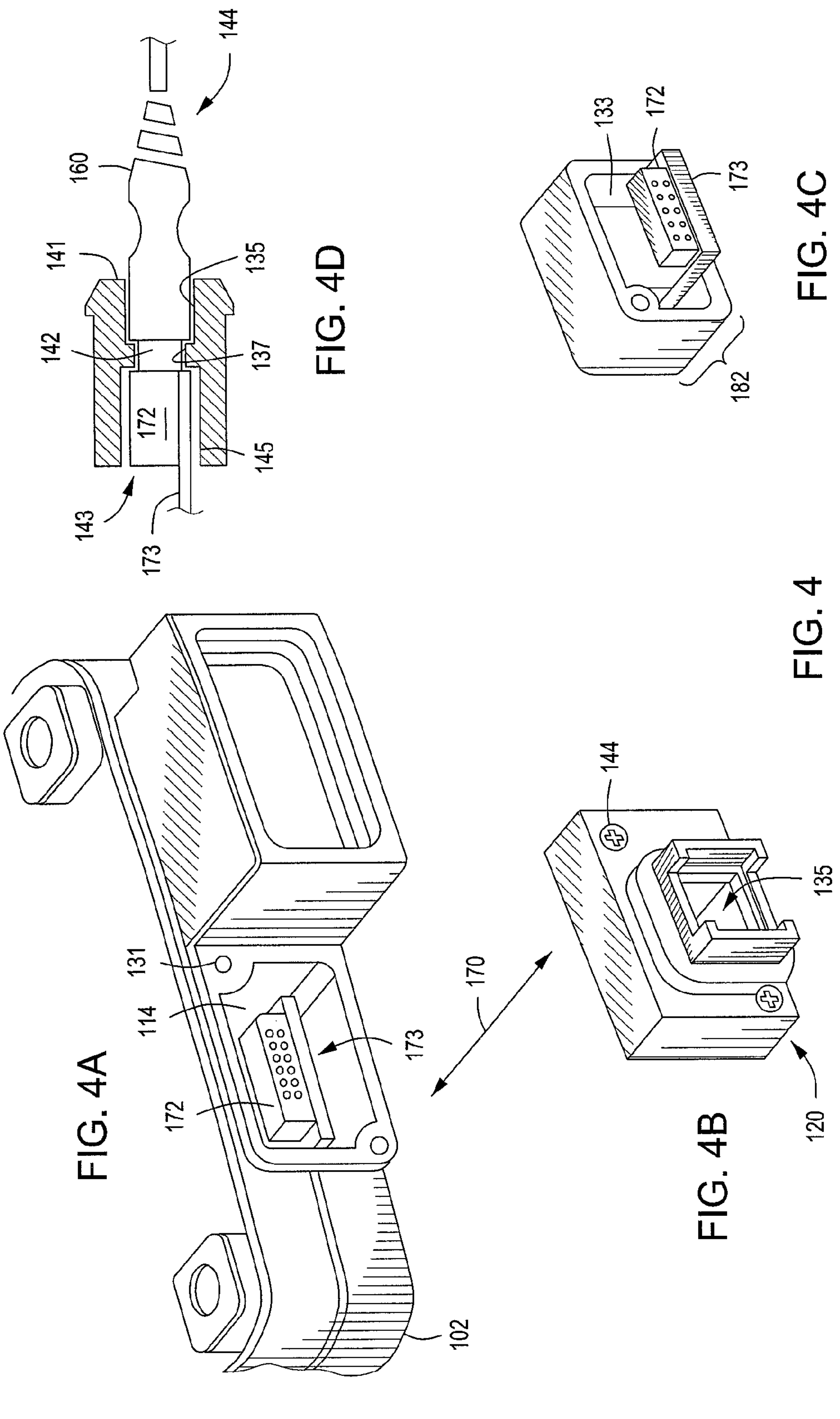
FIGS. 4A-D illustrate front, rear and side views of a support structure for a USB socket connector according to an embodiment of the invention.

As shown in FIGS. 4A, when the support structure module 120 is mounted to the housing along direction 170, the support structure module 120 is in close contact with sides, top and bottom of the USB socket 172 and the printed circuit assembly 173. FIG. 4C shows the rear view when the support structure module 120 is mounted to the housing 102. Side view in FIG. 4D shows further details of various features of the support structure module 120. A feature of the support structure module 120 is a close and extended fit when the USB plug 160 is inserted into the support structure module 120 to mate with the USB socket connector 172.

Another feature is that module 120 provides a close guide through the tailored molding for the USB plug 160 to mate the USB socket connector 172. The close guide limits the USB plug's movement. In some embodiments, the features described are provided by the construction of the module 120 to provide mechanical alignment guidance and support of the USB plug 160 by means of a socket which is substantially recessed from the outer face of the aperture; and positioned with 360 degree walling around the USB plug's over molding to limit radial movement of the USB plug and prevent deformation of the USB socket connector 172 during radial pull on the cable and the USB plug 160 once mated. Furthermore, by fastening the support structure module 120 to the housing 102, the support structure module 120 carries substantially all the cable load directly to the housing instead of the USB socket connector 172.

Another feature of the module 120 is that it provides further support for a mounting joint between the USB socket connector 172 and PCA 173. By removing load from the mounting joints, for example, solder joints with mechanical keying into the base unit main housing structure, the module 120 greatly enhances the signal delivery reliability. By closely supporting the USB socket connector 172 and PCA 173 and properly designing the dimension 182 of the support structure module 120, the socket 172 is aligned and fixed at desirable position to limit space for movement.

The support structure module 120 reduces the USB socket connector's 172 vulnerability by providing supplemental mechanical support features and reducing the forces (or loads) applied to various vulnerable points. The described embodiments allow for using of standard signal delivery connector such as standard Ethernet, USB (type A or B) connector and cable, without demanding any proprietary non-standard signal delivery components like non-standard cable and/or socket connector. One advantage of using standard cable and socket is that the described support structure module 120 can be mounted on the equipment body unit directly without any additional interconnect wiring which adds to the cost.

The support structure module 120 described herein may be constructed of any rigid structural material or materials and may be constructed in configurations to provide structural support. Suitable materials may include molded plastic. Though, it should be appreciated that a material of a slight amount of compliance may be used. For example, a hard rubber may be used to form support structure module 120. Materials that are more rigid than a conventional elastomer are preferred. The support structure module 120 described herein is not limited to automotive applications, it is applicable to any scenario when a communication equipment has an installed or mounted signal delivery connector.

As previously described, the diagnostic tool 100 includes a normal operating mode and multiple low power modes. As an example, a passive state, a sleep state and a low power suspend state for high temperature operations were described. The modes were described as being entered in response to different conditions including environment and power availability. In some embodiments, though two or more modes are entered in response to different conditions, the components actively powered and the operations performed in those modes may be the same. For example, in some embodiments, the device may perform the same operations when in the sleep state and in the low power suspend state for high temperature operation. Though, it should be appreciated that any suitable number of lower power modes may be supported and in each the system may perform any suitable number of operations or, conversely, may have any suitable components that are powered down or perform a reduced set of operations relative to a normal power state.

In still another embodiment, the diagnostic tool can act as a pass through diagnostic data device. The diagnostic tool can be controlled by a remote device to collect and pass through the data but still operate in the various embodiments described herein. A wired or wireless connection across a network connection such as TCP/IP, GSM and others can be used so that the remote device can control the diagnostic tool. In such an embodiment, the microprocessor in the diagnostic tool serves in a slave mode providing a bidirectional data and control interface to the remote processor.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

A computer program described herein can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network. In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

Also, the diagnostic tool may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. Components of different implementations described herein may be combined to form other implementations not specifically set forth above. Components may be left out of the structures described herein, or changed, without adversely affecting their operation. Furthermore, various separate components may be combined into one or more individual components to perform the functions described herein.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool, comprising:

a processor to control functions of the diagnostic tool and retrieves diagnostic data from a vehicle;

a memory that stores a software to operate the diagnostic tool and the retrieved diagnostic data, the memory communicates with the processor and stores the retreived diagnostic data in a circular buffer;

a connector interface that connects the diagnostic tool to a data link connector in the vehicle, the connector interface communicates with the processor;

a serial communication interfaces that allows the diagnostic tool to communicate with the vehicle in at least one communication protocol, the serial communication interfaces communicates with the processor; and a recessed interface socket within a housing of the diagnostic tool, the recessed interface socket having a removable support structure module, wherein the removable support structure module includes a first cavity, a second cavity and a passage formed between the first and second cavities.

2. The tool of claim 1, wherein the first cavity supports a socket connector of the diagnostic tool and the second cavity and the passage support a plug connector of a communication plug when the socket connector is coupled to the plug connector.

3. The tool of claim 1, wherein the passage has an opening that is less than a first opening of the first cavity or a second opening of the second cavity.

4. The tool of claim 1, wherein the removable support structure module is an integrally formed housing that surrounds a portion of a plug connector so that a majority of support for the plug connector is provided by the removable support structure module instead of a socket connector of the diagnostic tool.

5. The tool of claim 4, wherein the housing of the removable support structure module is configured to receive a USB plug.

6. The tool of claim 2, wherein a portion of the second cavity is beveled to guide the plug connector.

7. The tool of claim 1, wherein the removable support structure module is coupled to the housing by screws.

8. The tool of claim 4, wherein the second cavity and the passage cooperate with each other to hold the plug connector.

9. A diagnostic tool, comprising:

means for processing functions of the diagnostic tool and retrieves diagnostic data from a vehicle;

means for storing a software to operate the diagnostic tool and the retrieved diagnostic data, the means for storing communicates with the means for processing and stores retrieved diagnostic data in a circular buffer;

means for interfacing the diagnostic tool to a data link connector in the vehicle, the means for interfacing communicates with the means for processing;

means for communicating that allows the diagnostic tool to communicate with the vehicle in at least one communication protocol, the means for communicating communicates with the means for processing; and means for receiving that is recessed and formed within a housing of the diagnostic tool, the means for receiving having a removable support structure module, wherein the removable support structure module includes a first cavity, a second cavity and a passage formed between the first and second cavities.

10. The tool of claim 9, wherein the first cavity supports a socket connector of the diagnostic tool and the second cavity and the passage support a plug connector of a communication plug when the socket connector is coupled to the plug connector.

11. The tool of claim 9, wherein the passage has an opening that is less than a first opening of the first cavity or a second opening of the second cavity.

12. The tool of claim 9, wherein the removable support structure module is an integrally formed housing that surrounds a portion of a plug connector so that a majority of support for the plug connector is provided by the removable support structure module instead of a socket connector of the diagnostic tool.

13. The tool of claim 12, wherein the housing of the removable support structure module is configured to receive a USB plug.

14. The tool of claim 10, wherein a portion of the second cavity is beveled to guide the plug connector.

15. The tool of claim 9, wherein the removable support structure module is coupled to the housing by screws.

16. The tool of claim 12, wherein the second cavity and the passage cooperate with each other to hold the plug connector.

* * * * *